United States Patent [19]
Whitmire et al.

[11] Patent Number: 5,190,249
[45] Date of Patent: Mar. 2, 1993

[54] AIRCRAFT DEICER FLUID HEATING AND PROPULSION SYSTEM

[75] Inventors: Thomas W. Whitmire, Winter Park; Edwin C. Hightower, Orlando, both of Fla.

[73] Assignee: Zwick Energy Research Organization, Inc., Huntington Beach, Calif.

[21] Appl. No.: 414,628

[22] Filed: Sep. 25, 1989

[51] Int. Cl.⁵ .................................................. B64D 15/00
[52] U.S. Cl. ................................. 244/134 R; 244/134 C
[58] Field of Search ............ 244/134 R, 134 C, 134 A, 244/134 B, 117 A, 57; 60/428–430; 123/41.1; 239/165, 135, 172, 130, 131; 122/26; 237/1 R, 2 R, 12.1, 12.3; 15/321, 340.1; 62/50.3; 134/101, 105

[56] References Cited

U.S. PATENT DOCUMENTS

| | | | |
|---|---|---|---|
| 2,366,089 | 12/1944 | Dewar | 244/134 B |
| 2,764,147 | 9/1956 | Brunner | 122/26 |
| 2,807,245 | 9/1957 | Unger | 123/41.1 |
| 3,080,857 | 3/1963 | Midderdorf | 123/41.1 |
| 3,243,123 | 3/1966 | Inghram et al. | 239/165 |
| 3,498,061 | 3/1970 | Prucha et al. | 60/430 |
| 3,587,237 | 6/1971 | Pierrat | 60/430 |
| 3,813,036 | 5/1974 | Lutz | 122/26 |
| 3,877,443 | 4/1975 | Hewing et al. | 123/41.1 |
| 4,073,437 | 2/1978 | Thorton-Trump | 239/165 |
| 4,090,668 | 5/1978 | Kochenour | 239/135 |
| 4,109,340 | 8/1978 | Bates | 15/321 |
| 4,184,331 | 1/1980 | Bentley | 60/430 |
| 4,191,348 | 3/1980 | Holwerda | 244/134 C |
| 4,197,712 | 4/1980 | Zwick | 62/50.3 |
| 4,264,826 | 4/1981 | Ullmann | 122/26 |
| 4,284,127 | 8/1981 | Collier | 239/130 |
| 4,333,607 | 6/1982 | Mueller et al. | 239/131 |
| 4,344,567 | 8/1982 | Howe | 122/26 |
| 4,383,412 | 5/1983 | Presley | 60/430 |
| 4,505,124 | 3/1985 | Mayer | 244/135 R |
| 4,651,927 | 3/1987 | Vestergaard | 239/172 |

*Primary Examiner*—Galen Barefoot
*Attorney, Agent, or Firm*—Beehler & Pavitt

[57] ABSTRACT

The invention is a system for heating aircraft deicing fluid. The system is an aircraft deicer such as shown in FIG. 2 which includes an engine 210. The deicer systems comprises a tank 270 for holding deicing fluid. First pump means 250,252 and 254 are driven by engine 210 and pump deicing fluid from tank 270 through piping or conduit 266,264,230. Backpressure valve means 251,253,255 is positioned the outlet of the first pump means 250,252,254 respectively, to continuously, substantially and directly heat deicing fluid to a temperature sufficient to deice the aircraft.

The system further comprises second pump means 212, 232 for directing deicing fluid through engine 210 to pick up heat rejected by engine 210. Once the deicing fluid has been pumped through engine 210, piping or a conduit means 216,222,228,230,266,264 connects the output of the second pump means 212,232 to the inlet of the first pump means 250,252 and 254.

16 Claims, 2 Drawing Sheets

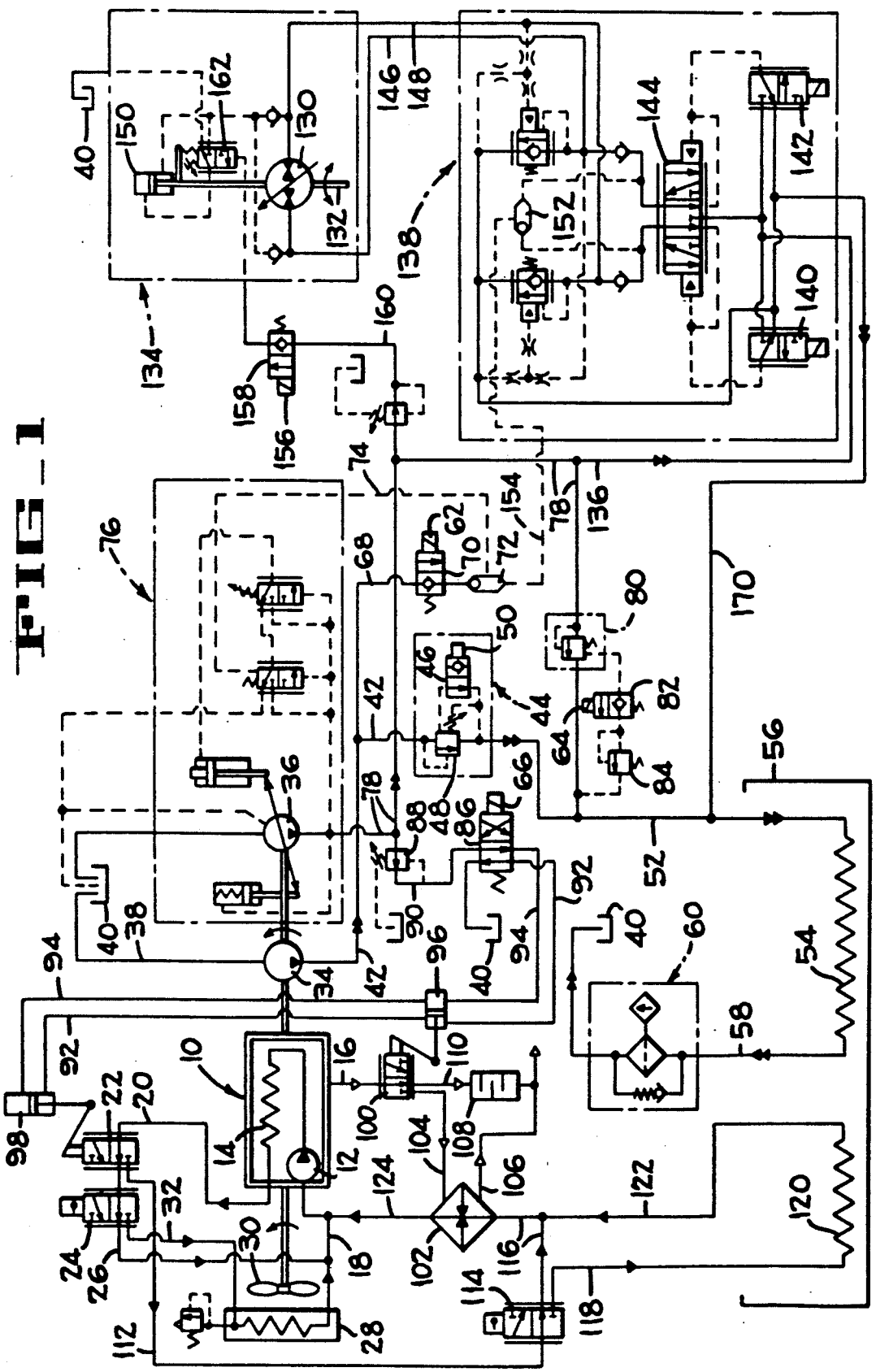

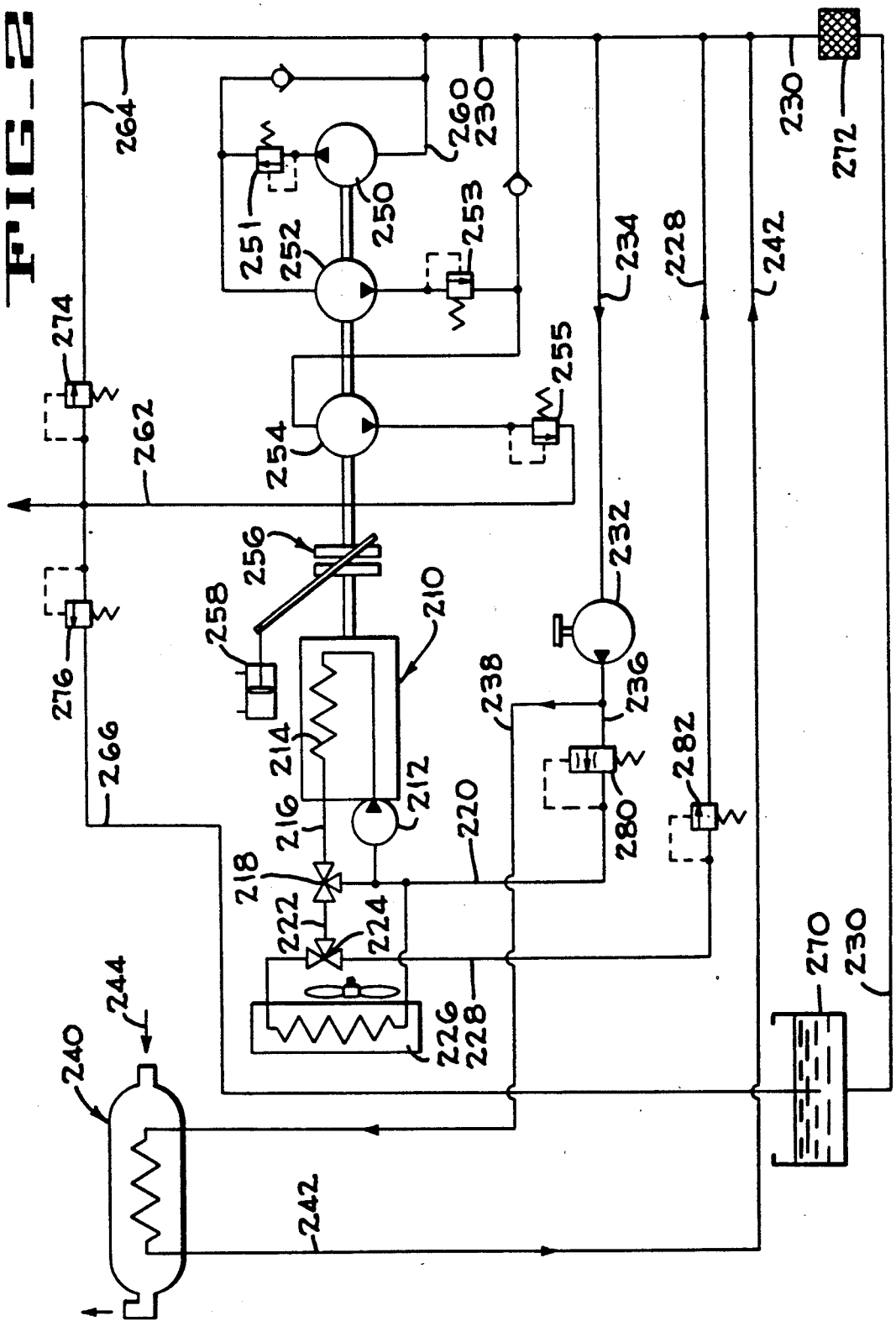
FIG_2

AIRCRAFT DEICER FLUID HEATING AND PROPULSION SYSTEM

This invention relates to aircraft deicers generally, and more particularly, to a system therefor which is capable of heating the aircraft deicing fluid to a suitable temperature using the heat generated by an internal combustion engine.

Conventional aircraft deicers have utilized one or more combustion type heaters to heat the aircraft deicing fluid (ADF) which requires the ADF to be pumped from a tank through exhaust gas heat exchangers associated with the heaters. The combustion type heater has relatively low thermal efficiency, is often difficult to start in cold weather, especially when diesel fuel is burned therein, requires frequent maintenance of the burner as well as the heat exchanger, and inherently creates a potential fire hazard both from the flame inherent within the burner and from the high temperature gases exiting from the heat exchanger. In addition, thixotropic and/or pseudo-plastic fluids, such as those classified by the Association of European Airlines as Type II ADF, generally cannot tolerate either the high temperatures encountered in the exhaust gas heat exchanger of a combustion type heater, or the pumping needed to circulate the ADF through the exhaust gas heat exchanger.

The present invention utilizes a conventional, internal combustion engine to provide all of the heat needed to raise the temperature of the ADF to the proper level, and, thus, eliminates the need for combustion type heaters along with the problems and limitations associated therewith. The system of the present invention recovers the heat rejected from the engine by transferring the heat from the engine's coolant and exhaust gases to the ADF, without the need for pumping the ADF, while providing controls to assure that the engine quickly reaches its proper operating temperature upon starting and will maintain that temperature through repeated filling of the deicer fluid tank with cold ADF. The system also converts the engine power, at least that portion not utilized to perform other work, to heat by pumping hydraulic fluid against a resistance and transferring the heat developed thereby in the hydraulic fluid to the ADF. The system is arranged to utilize the hydraulic fluid pressure to propel the deicer.

The present invention provides a system for heating aircraft deicing fluid by means of heat generated by an internal combustion engine which is devoid of combustion type heaters, which has a relatively high thermal efficiency, which is compatible with thixotropic and/or pseudo-plastic fluids, which may be safely utilized in close proximity to aircraft permitting simultaneous spraying of ADF on the aircraft and heating of the ADF, which has a relatively simple design rendering it reliable and easier to service, which permits a long machine life, and which is relatively easy to start and operate. These and other attributes of the present invention, and many of the attendant advantage thereof, will become more readily apparent from a perusal of the accompanying description in connection with the drawing, wherein:

FIG. 1 is a schematic of one embodiment of a system according to the present invention; and FIG. 2 is a schematic of another embodiment.

Referring to FIG. 1, there is shown a conventional engine, indicated generally at 10, which may be either Diesel or Otto cycle, and which includes a coolant pump 12 to circulate coolant through the engine. Combustion of the fuel and air occurring within the cylinders during operation of the engine 10 creates heat, some of which is transferred to the coolant, as indicated at 14, with the products of that combustion, i.e., exhaust gases, being expelled through conventional manifold means to exhaust pipe 16. During start and initial cold operation of the engine 10, the coolant is drawn through intake conduit 18 by the coolant pump 12, circulated through the engine 10, and forced through conduit 20, valves 22 and 24 and conduit 26 where a closed coolant loop is formed by joining with intake conduit 18. This permits a quick warm up of the engine, since the coolant bypasses a conventional radiator 28 associated with the particular engine 10, with fan 30, driven by the engine 10, drawing or blowing ambient air through the radiator 28 to transfer heat from the coolant to the air. When the coolant temperature reaches its minimum acceptable operating temperature, valve 24, which is a thermostatic metering valve, begins to shift downward diverting some of the coolant into conduit 32 leading to the radiator 28. Thermostatic valve 24 will progressively divert more of the coolant into conduit 32, as the coolant temperature increases, until all of the coolant flow is diverted to the radiator as the maximum acceptable operating temperature for the particular engine is approached.

The engine 10 also drives a fixed displacement, hydraulic pump 34 and a variable displacement, hydraulic pump 36. The pump 34 draws hydraulic fluid through a conduit 38 from reservoir 40 and discharges fluid under pressure into conduit 42, which connects with solenoid operated, vented relief valve assembly 44. The valve assembly 44 includes a solenoid valve 46 and a vented pressure relief valve 48. When the solenoid 50 on valve 46 is not energized, a small flow is established in the vent line of valve 48 through valve 46, which flow causes valve 48 to open permitting free flow of hydraulic fluid therethrough and into conduit 52 which connects with a hydraulic fluid to ADF heat exchanger 54 positioned in the bottom of a deicer fluid tank 56 on the deicer. A conduit 58 permits the hydraulic fluid to return to reservoir 40 through a filter assembly 60. The heat developed in the hydraulic fluid being moved by the pump 34 is a result of pressure losses in the lines, fittings and valves between the pump and the reservoir, which is relatively small. The ADF heating system is activated by closing a switch, not shown, which electrically energizes the solenoid 50 as well as the solenoids 62, 64 and 66. When energized, the solenoid 50 shifts the valve 46 to the left, as seen in the drawings, blocking the vent line from valve 48, which causes pressure to build up to the setting of pressure relief valve 48, e.g., 2800 psi. This pressure is transmitted through conduit 68, which connects with conduit 42, and through two-way valve 70, which also has bee shifted to the left by energization of its associated solenoid 62, to a double check valve 72. A pilot line 74 connected to the double check valve 72 transmits this pressure to a flow and pressure compensated control 76, such as that provided on a Rexroth Worldwide Hydraulic Company Model A10V63DFR, for example. With pressure in pilot line 74 at the setting of relief valve 48, the control 76 shifts the variable displacement pump 36 to maximum displacement and maximum flow is directed from the pump 36 through conduit 78 to vented pressure valve 80. The two way valve 82 has been shifted downward, as viewed in the drawings, by the energization of its solenoid 64 so that valve 80 is vented to the pressure relief valve 84. Thus, the valve 80 will open when vent line flow is established by pressure exceeding the pressure setting of relief valve 84. When relief valve 84 opens, flow established in the vent line will cause valve 80 to open which discharges the flow from pump 36 into the conduit 52. In order to assure that the pump 36 is maintained at full stroke, the pressure setting of relief valve 84 is set slightly lower than the pressure of relief valve 48. For example, with the compensator control 76 set to maintain at least a 200 psi pressure differential, the compensator control 76 will receive a 2800 psi signal through pilot line 74, which will be created by the setting of relief valve 48, and pump control 76 will set the stroke at full displacement in an attempt to achieve 3000 psi pressure from the pump 36, i.e., 2800 psi plus 200 psi. If the relief valve 84 is set lower, e.g., 2600 psi, then the setting of valve 48, it will be assured that the pump 36 will always be at full stroke in the heating mode of operation because the output from the pump 36 is being discharged to the heat exchanger 54 at 2600 psi by valve 84. In other words, the compensator control 76 will set the pump 36 to full stroke to achieve 3000 psi which cannot be achieved since the valve 80 is opening at 2600 psi. Thus, maximum flow from the pump 36 will be discharged through valve 80 at the pressure setting of valve 84, heating the hydraulic fluid, which heat is then transferred to the ADF through the heat exchanger 54 submerged in the ADF tank 56.

The solenoid 66 of four way valve 86 is also energized in the heating mode, which shifts valve 86 to the left, as viewed in the drawing. Hydraulic fluid from the pump 36, which is dropped to a low pressure, e.g., 150 psi, by pressure reducing valve 88 is supplied to the valve 86 through conduit 90. In the aforementioned shifted position, valve 86 connects conduit 90 with conduit 92 and conduit 94 with the reservoir 40. Pressure is, therefore, communicated to the rod end of both the hydraulic actuators 96 and 98 while the head ends thereof are vented to the reservoir, causing the actuators to contract. An exhaust flapper valve 100 is connected to the actuator 96 and is shifted to the left, as viewed in the drawing, by contraction of the actuator 96 which directs the exhaust gases flowing through exhaust pipe 16 to an exhaust gas-to-coolant heat exchanger 102 through pipe 104. After flowing through the heat exchanger 102 the gases are expelled to atmosphere through exhaust pipe 106. The tortuous path for the exhaust gases within the heat exchanger 102 sufficiently muffles the engine exhaust so that passage through a separate muffler is not required. A muffler 108 is, however, provided and is connected to the flapper valve 100 by exhaust pipe 110. When the valve 100 is positioned as shown in the drawing, i.e., when the actuator 96 is extended, exhaust gases flowing through exhaust pipe 16 are directed into pipe 110 and the muffler 108 before being expelled to atmosphere. The valve 22, which is a three way valve, such as a 3-way ball valve, for example, is shifted downward, as viewed in the drawing, to direct coolant in conduit 20, which would otherwise flow to the inlet of valve 24, to a conduit 112 which connects with a metering thermostatic valve 114. When coolant temperature is lower than acceptable for inlet to the engine, adjusting for heat input to the coolant in the heat exchanger 102, the valve 114 will be in the position shown in the drawing in which all coolant flow is directed from conduit 112 to a conduit 116 leading to the coolant inlet to the heat exchanger 102. When the coolant temperature at the valve 114 reaches the acceptable minimum temperature, the thermostatic valve 114 will begin to direct a portion of the coolant flow through conduit 118 connected to a coolant to ADF heat exchanger 120 positioned in the bottom of the deicer fluid tank 56. The quantity of coolant flow to conduit 118 will progressively increase until, at an acceptable maximum temperature, all of the coolant will flow through conduit 118. A conduit 122 connects the coolant outlet of the heat exchanger 120 with conduit 116 and the coolant inlet to heat exchanger 102. A conduit 124 connects the coolant outlet of heat exchanger 102 to the conduit 18 and the inlet to the coolant pump 12 on the engine 10 When the ADF temperature is extremely low, as when the tank 56 is initially filled, the temperature differential between the coolant the cold ADF may drop the coolant temperature so low, even after heat has been added by the heat exchanger 102, that the engine 10 would be chilled by the cold coolant entering the engine, causing accelerated wear of the engine, and perhaps erratic operation thereof. The thermostatic valve 114 assures that the temperature of the coolant at the inlet to the pump 12 will remain at or above a minimum acceptable temperature, after the initial warm-up period.

Positioning of the heat exchanger 102 on the outlet side of the heat exchanger 120 provides optimum heat transfer from the exhaust gases to the coolant because the temperature differential between these fluids if the greatest. However, the design and operating characteristics of a particular engine may not tolerate a high inlet water temperature. Repositioning of the heat exchanger 102 so that it is in the coolant conduit 112 provides a convenient way of insuring that inlet water temperature will not be too high. With the heat exchanger 12 thus repositioned, the thermostatic valve 114 will sense a hotter coolant sooner and will divert more quickly and in greater quantities coolant flow to the heat exchanger 120. Engines that tend to run hot will, therefore, receive a lower temperature coolant at the inlet.

Hydraulic loading on the engine 10 by the pumps 34 and 36 permits operation of the engine at or near its maximum power which results in maximum heat being available in both the engine coolant and the exhaust gases. The power of the engine transmitted to the hydraulic pumps 34 and 36 is converted to heat in the hydraulic fluid. The heat exchanger 54 transfers the heat in the hydraulic fluid to the ADF in the tank 56, while the heat exchanger 120 transfers the heat in the engine coolant to the ADF and the heat in the exhaust gases is transferred by the heat exchanger 102 to the engine coolant, which has been chilled by the ADF in tank 56. The heating system is deactivated by simultaneously de-energizing the solenoids 50, 62, 64 and 66, such as by opening the aforementioned switch, not shown, or by a thermostatic electrical switch, in series with the aforementioned switch, which thermostatic switch senses the temperature of the ADF in tank 56 and opens when a predetermined maximum ADF temperature is reached.

The output from the variable displacement pump 36 may also be utilized for performing other functions on the deicer, such as elevating, extending or retracting, and swinging the boom, driving the ADF pump for spraying aircraft and/or propulsion of the vehicle. The implementation of a propulsion or ground drive for the deicer has been incorporated in the system shown in the drawing and is representative of how a boom control and/or an ADF pump drive may also be provided.

Considering the drive mode with the heating system deactivated, the solenoids 50, 62, 64 and 66 would be de-energized. Under that condition, engine exhaust flows through flapper valve 100 and the muffler 108 to atmosphere, and engine coolant is circulated by coolant pump 12 through valves 22 and 24 and back to the engine, until the coolant temperature reaches a predetermined minimum operating temperature, at which point the thermostatic valve cracks open and directs some coolant flow to the radiator 28 permitting convection of the heat in the coolant to the ambient air which convection is enhanced by flow of air through the radiator by the fan 30. The thermostatic valve 24 diverts more coolant to the radiator as coolant temperature rises until the heat transferred from engine to coolant matches the heat rejected to the atmosphere by the radiator. The output from pump 34 flows through the relief valve 48 of valve assembly 44 and through the hydraulic fluid to ADF heat exchanger 54 back to the reservoir 40. The pressure against which pump 34 works is only the resistance to flow through the hydraulic conduits, fittings and valves, which pressure is low generating only a small amount of heat. With valve 70 blocking communication between the pump 34 and the double check valve 72, the pressure in pilot line 74 will be low and controller 76 will cause the pump 36 to move to a small displacement, enough to make up for fluid leakage and to maintain a small pressure differential.

A variable displacement, rotary hydraulic motor 130 has an output shaft 132 which is connected to drive one or more of the ground-engaging wheels on the deicer through a conventional drive train. An automatic high pressure control assembly 134 with remote override, such as that sold by Rexroth Worldwide Hydraulics Company as Model A6V107HA, for example, is connected to control the displacement of the motor 130. The output of the pump 36 is communicated through conduit 136, connected to conduit 78, to an electrohydraulic proportional control valve assembly 138 with anti-cavitation check valves, such as that sold by Vickers Company and identified as Model CMX 100, for example. The valve assembly 138 includes a pair of solenoid valves 140 and 142, which valves are of the metering type and are shifted an amount proportional to the current of an electrical signal transmitted from an operator control in the cab of the deicer. Only one solenoid valve, 140 or 142, is energized at a time, since one determines forward direction of travel and the other determines reverse. An electric signal to one of the valves 140 or 14w will direct fluid pressure to the adjacent end of a metering drive valve 144 shifting it to direct a proportional amount of pressure fluid through one of the conduits 146 or 148 to the variable displacement motor 130 causing rotation of the motor 130 and its shaft 132, and accordingly, propulsion of the deicer. The pressure present in the pressurized one of conduits 146 or 184 is directed to the rod end of the displacement controller 150 in assembly 134 to match motor displacement to the torque required to drive the deicer. The drive pressure is also transmitted through double check valve 152, pilot line 154 and double check valve 72 to pilot line 74 and hence to control 76 so that the displacement Of pump 36 is adjusted to maintain the predetermined pressure differential, e.g., a pump pressure which exceeds motor pressure by 200 psi. The power delivered to the drive wheels is therefore controlled as a function of the current of the electrical signal sent to the solenoid of one of the valves 140 and 142.

For improved low speed control and maximum hill climbing ability, an electric signal is sent to the solenoid 156 of two way valve 158. Pump pressure is directed through conduit 160 to shift the low speed valve 162 in the assembly 134. Pressure is then directed through valve 162 to the head end of the actuator 150 causing the motor 130 to be shifted to full stroke or maximum displacement providing its greatest torque output but slowest speed. In order to protect components in the deicer drive train and the motor 130 from excessive stress, the maximum torque the motor 130 is capable of developing is limited by the pressure setting of relief valve 80.

Combined vehicle propulsion and ADF heating is possible simply by energizing the solenoids 50, 62, 64 and 66 while simultaneously sending an electrical signal to the solenoids of one of the valves 140 and 142. Both the ADF heating system and the drive system will operate as described herein, except that the lower setting of relief valve 84 will control the maximum pressure in the drive system since the relieve valve 80 will open at the pressure determined by the pressure setting of relief valve 84 when the solenoid 64 is energized. As a consequence, the maximum gradability of the deicer will be reduced. Any heat generated in the drive circuit due to inefficiencies in that circuit will also be transferred to the ADF in tank 56 since the hydraulic fluid utilized in the drive system is returned through conduits 170 and 52 to the heat exchanger 54.

The embodiment of FIG. 2 recovers engine heat without involving the hydraulic circuit that is provided for control and powering of deicer components, such as the boom and/or drive circuit, for example. The engine 210, like engine 10, includes a coolant pump 212 to circulate coolant, which is water and ADF, through the internal passages 214 of the engine 210, and would also drive one or more hydraulic pumps, not shown, to provide hydraulic fluid under pressure to the hydraulic circuit or circuits referred to above. The coolant would be heated in the passages 214 and would exit the engine 210 through conduit 216 to a thermostatic valve 218, which will direct the coolant flow to conduit 220 connected to the intake of the pump 212 when the coolant temperature is below a predetermined minimum, e.g., 180° F., to permit the engine to quickly warm to proper operating temperature or to conduit 222. Conduit 222 is connected to thermostatic valve 224 which will direct coolant flow through a radiator 226 if the temperature is above a predetermined maximum, e.g., 190° F., so that excess heat can be rejected to atmosphere or through conduit 228 to supply conduit 230.

An auxiliary pump 232, constantly driven by the engine 210, draws coolant from the supply conduit 230 through conduit 234 and discharges into a conduit 236. A branch conduit 238 connects conduit 236 with an exhaust gas heat exchanger 240. A return conduit 242 connects the coolant outlet from the exhaust gas heat exchanger 240 to the supply conduit 230. When the deicer is being operated in a non-heating mode, such as when the ADF tanks are empty, the flow of exhaust gases from the engine 210 to the exhaust gas heat exchanger 240, as indicated by the arrow 244, would be diverted to atmosphere, in a manner similar to that employed in the embodiment of FIG. 1.

In the heating mode, the engine exhaust gases are directed through the heat exchanger 240 and the engine 210 is connected to drive the pumps 250, 252 and 254 such as through hydraulic clutch 256, which may be selectively engaged and disengaged by pressurizing the appropriate end of the actuating hydraulic cylinder 258. The pump 250 draws coolant from the supply conduit 230 through conduit 260 and discharges through a relief valve 251 to the inlet of pump 252. Pump 252 in turn discharges through a relief valve 253 to the inlet of pump 254, which discharges through a relief valve 255. The pumps 250, 252 and 254 are essentially of the same capacity and the coolant is heated by pumping against the relief valves 251, 253, and 255, respectively. The output from pump 254 is directed to conduit 262 which connects in a conventional manner with the spray nozzle or nozzles of the deicer, as indicated in the arrowhead at the free end of conduit 262. A pair of conduits 264 and 266 are connected to the high pressure conduit 262, conduit 264 connecting with supply conduit 230 and conduit 266 returning coolant to an ADF tank or tanks 270. The supply conduit 230 connects with the tank 270 with a filter 272 interposed upstream of any of the connections with other conduits so that all coolant entering the pumping circuit is filtered. A relief valve 274 is interposed in conduit 264, as is a similar valve 276 in conduit 266. Valve 274 is set to open at a lower pressure than valve 276, e.g., 200 psi for the former valve and 220 psi for the later, so that the output from the pumps 250, 252 and 254 tends to recirculate through conduit 264, when there is no release of coolant through the aforementioned nozzles. The temperature of the coolant discharged when such nozzles are opened is at its highest and a last-pass heating effect is thus achieved.

In the embodiment of FIG. 2, the engine coolant and the ADF are the same fluid. Type I fluids are essentially glycol and are often mixed with water, which are the same fluid compositions used as coolants in internal combustion engines. The pumps 250, 252 and 254 working against the relief valves 251, 253 and 255 produce heat directly in the ADF eliminating the need for a heat exchanger. The heat rejected to the coolant is transferred directly to the ADF since coolant and ADF are the same fluid. Since coolant is circulated through the exhaust gas heat exchanger, the heat to the exhaust gases is also transferred to the ADF. In order to prevent inadvertently discharging through the nozzles a volume of ADF in excess of the tank 270, which could damage the engine 210, a capture system is provided to assure a sufficient volume of coolant within the engine coolant circuit. The capture system includes a flow control valve 280 interposed in the conduit 236 which connects the pump 232 with the inlet to pump 212 and a pressure relief valve 282 interposed in the conduit 228. The valve 280 assures a minimum flow to the engine and the pressure relief valve 282, which opens at a low pressure, e.g., 14 psi., insures that fluid will not exit the engine/radiator loop, regardless of whether the valve 224 is directing coolant to the radiator 226 or the conduit 228, if insufficient coolant is available to generate at least 14 psi. Any reduction in coolant volume available to the engine 210 will cause engine coolant temperature to rise. Valve 224 will then direct coolant to the radiator. Any leakage into the conduit 228 will be blocked by the valve 82. The engine 210 will, therefore, be protected from overheating by the valves 282 and 280.

Multiple pumps, such as 250, 252 and 254, are preferred to a single pump having the same capacity as the combined multiple pumps, because of lower cost and smaller or more compact size. Water is almost incompressible and a single pump capable of producing the heat required would be inordinately large and costly. Three smaller pumps, each doing a third of the work, is preferred, although two or four pumps, each doing its proportional share of work to heat the coolant/ADF, would provide benefits over a single pump.

While two embodiments of the present invention have been illustrated and described herein, various changes may be made therein without departing from the spirit of the invention as defined by the scope of the appended claims.

What is claimed is:

1. A system for heating aircraft deicing fluid in a tank on a deicer having an engine, said system comprising:
    a hydraulic fluid-to-deicer fluid heat exchanger submerged in said tank;
    a fixed displacement hydraulic pump driven by said engine;
    a first relief valve receiving the output from said fixed pump and dumping it to said heat exchanger, said first relief valve having a first pressure setting;
    a variable displacement hydraulic pump driven by said engine and having a compensator to adjust its displacement;
    a second relief valve receiving the output from said variable pump and dumping it to said heat exchanger, said second relief valve having a second pressure setting lower than said first pressure setting; and
    pilot line means communicating said first pressure to said compensator whereby said compensator maintains said variable pump at maximum displacement.

2. The invention according to claim 1, wherein said engine is water cooled and has a coolant pump driven thereby;
    an engine coolant-to-deicing fluid heat exchanger submerged in said tank;
    conduit means permitting said coolant pump to circulate coolant between said engine and said last-mentioned heat exchanger;
    a thermostatic metering valve interposed in said conduit means and causing said coolant to bypass said last-mentioned heat exchanger when coolant temperature is below a predetermined acceptable minimum temperature and shiftable as said coolant temperature rises above said minimum to progressively bypass less of said coolant flow until a maximum acceptable operating coolant temperature is reached when no coolant flow is bypassed.

3. The invention according to claim 1, and further comprising:
    an exhaust gas-to-engine coolant heat exchanger interposed in said conduit means for transferring heat in the exhaust gases to the coolant to reduce the possibility of the engine being chilled by cold device fluid entering the engine.

4. The invention according to claim 3, wherein said exhaust gas-to-coolant heat exchanger is positioned in said conduit means upstream of said thermostatic valve.

5. The invention according to claim 3, wherein said exhaust gas-to-coolant heat exchanger is positioned in said conduit means downstream of said thermostatic valve.

6. A system for heating aircraft deicing fluid in a tank on a deicer having a water-cooled engine with a coolant pump driven thereby, comprising:

an engine coolant-to-deicing fluid heat exchanger submerged in said tank;

conduit means permitting said coolant pump to circulate coolant between said engine and said last-mentioned heat exchanger;

a thermostatic metering valve interposed in said conduit means and causing said coolant to bypass said last-mentioned heat exchanger when coolant temperature is below an acceptable minimum temperature and shiftable as coolant temperature rises above said minimum to progressively bypass less of said coolant flow until a maximum operating coolant temperature is reached when no coolant flow is passed.

7. The invention according to claim 6, and further comprising:

an exhaust gas-to-engine coolant heat exchanger interposed in said conduit means for transferring heat in the exhaust gases to the coolant to reduce the possibility of the engine being chilled by cold coolant fluid entering the engine.

8. The invention according to claim 7, wherein said exhaust gas-to-coolant heat exchanger is positioned in said conduit means upstream of said thermostatic valve.

9. The invention according to claim 7 wherein said exhaust gas-to-coolant heat exchanger is positioned in said conduit means downstream of said thermostatic valve.

10. The invention according to claim 6, and further comprising:

a hydraulic fluid-to-deicer fluid heat exchanger submerged in said tank;

a fixed displacement hydraulic pump driven by said engine;

a first relief valve receiving the output from said fixed pump and dumping it to said heat exchanger, said first relief valve having a first pressure setting;

a variable displacement hydraulic pump driven by said engine and having a compensator to adjust its displacement;

a second relief valve receiving the output from said variable pump and dumping it to said heat exchanger, said second relief valve having a second pressure setting lower than said first pressure setting; and pilot line means communicating said first pressure to said compensator whereby said compensator maintains said variable pump at maximum displacement.

11. The invention according to claim 10, and further comprising:

an exhaust gas-to-engine coolant heat exchanger interposed in said conduit means for transferring heat in the exhaust gases to the coolant to reduce the possibility of the engine being chilled by cold device fluid entering the engine.

12. The invention according to claim 11 wherein said exhaust gas-to-coolant heat exchanger is positioned in said conduit means upstream of said thermostatic valve.

13. The invention according to claim 10, and further comprising:

a variable displacement motor;

drive train means connected to said motor for propulsion of said deicer; and an electro-hydraulic proportional control valve for directing pressure to said motor in response to an input signal.

14. A system for heating aircraft deicing fluid on a deicer having an engine, said system comprising:

a tank for holding deicing fluid;

first pump means capable of being driven by the engine connected to draw deicing fluid from said tank; and back pressure valve means positioned in the outlet from said first pump means to continuously, substantially and directly heat the deicing fluid to a temperature to deice said aircraft.

15. The system according to claim 14 and further comprising:

second pump means for directing deicing fluid through said engine to pick up heat rejected by the engine and conduit means connecting the output from said second pump means to the inlet of said first pump means.

16. The system according to claim 15 and further comprising:

an exhaust gas to deicing fluid heat exchanger connected to the output from said second pump means and returning the deicing fluid to the inlet of said first pump means.

* * * * *